United States Patent
Lee et al.

(10) Patent No.: US 11,220,605 B2
(45) Date of Patent: Jan. 11, 2022

(54) FUSED ANTI-SOILING AND ANTI-REFLECTIVE COATINGS

(71) Applicant: UT-Battelle, LLC, Oak Ridge, TN (US)

(72) Inventors: Dominic F. Lee, Knoxville, TN (US); Jaehyeung Park, Knoxville, TN (US); Jaswinder Sharma, Oak Ridge, TN (US); Georgios Polyzos, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 106 days.

(21) Appl. No.: 16/203,127

(22) Filed: Nov. 28, 2018

(65) Prior Publication Data

US 2020/0165462 A1    May 28, 2020

(51) Int. Cl.
C09D 5/00    (2006.01)
C09D 1/00    (2006.01)

(52) U.S. Cl.
CPC .............. *C09D 5/006* (2013.01); *C09D 1/00* (2013.01); *C09D 5/00* (2013.01)

(58) Field of Classification Search
CPC .................................................... C09D 5/006
See application file for complete search history.

(56) References Cited

U.S. PATENT DOCUMENTS

2015/0023894 A1*  1/2015  Hsu ........................ A61K 8/34
                                                              424/59

OTHER PUBLICATIONS

Kesmez, Effect of acid, water and alcohol ratios on sol-gel preparation of antireflective amorphous SiO2 coatings, Journal of Non-Crystalline Solids, Aug. 2011, 357, p. 3130-3135 (Year: 2011).*

Makita, Sol-Gel Preparation of Silica Films with Controlled Surface Morphology and Their Application to a Low Reflective Glass, Journal of Sol-Gel Science and Technology, 14, (1999), p. 175-186 (Year: 1999).*

Che, The structure and morphology control of mesoporous silica under acidic conditions, Microporous and Mesoporous Materials, vol. 85, Issue 3, Nov. 2005, p. 207-218 (Year: 2005).*

(Continued)

*Primary Examiner* — Tabatha L Penny
(74) *Attorney, Agent, or Firm* — Fox Rothschild LLP

(57) ABSTRACT

A method for applying a coating to a surface includes the step of providing a reaction mixture comprising a silicon alkoxide and an alcohol. A reaction limiting amount of water is added. The silicon alkoxides and water are allowed to react to form silica precursor particles during an initial reaction period. A coating precursor composition is prepared by adding an acid soluble in the alcohol to the reaction mixture during a second reaction period after the initial reaction period. The precursor silica particles grow to form silica nanofeatures having a major dimension that is larger than a major dimension of the silica precursor particles. The coating precursor composition is applied to a surface, and the alcohol and water are allowed to evaporate and the silica nanofeatures to adhere to the surface and form a nanostructured layer on the surface. A coating precursor composition and a coated article are also disclosed.

21 Claims, 9 Drawing Sheets

(56) References Cited

OTHER PUBLICATIONS

Lan, Transparency and water-resistance enhancement of AR coating for the cover glass in the solar cell module, SICE Annual Conference 2014, Sep. 2014, p. 1413-1418 (Year: 2014).*

Tanesab et al.: "The contribution of dust to performance degradation of PV modules in a temperate climate zone", Solar Energy 2015, 120, 147-157.

Costa et al.: "Dust and soiling issues and impacts relating to solar energy systems: Literature review update for 2012-2015", Renewable and Sustainable Energy Reviews 2016, 63, 33-61.

Mani et al.: "Impact of dust on solar photovoltaic (PV) performance: Research status, challenges and recommendations", Renewable and Sustainable Energy Reviews 2010, 14, 3124-3131.

Bouaddi, et al.: "Comparative analysis of soiling of CSP mirror materials in arid zones", Renewable Energy 2017, 101, 437-449.

Nostell et al.: "Optical and mechanical properties of sol-gel antireflective films for solar energy applications", Thin Solid Films 1999, 351, 170-175.

Stober, W.: "Controlled growth of monodisperse silica spheres in the micron size range", J. Colloid Interface Sci. 1968, 26, 62-69.

Danks et al.: "The evolution of 'sol-gel' chemistry as a technique for materials synthesis", Materials Horizons 2016, 3, 91-112.

Brinker et al.: "Sol-Gel Science: The Physics and Chemistry of Sol-Gel Processing, Academic Press", Academic Press London, UK, 1990.

Innocenzi, P.: "From the Precursor to a Sol. In the Sol to Gel Transition", Springer International Publishing: Cham, 2016; pp. 7-25.

Ye et al.: "Jiang, B.: Preparation of antireflective coatings with high transmittance and enhanced abrasion-resistance by a base/acid two-step catalyzed sol-gel process", Sol. Energy Mater. Sol. Cells 2011, 95, 2347-2351.

Guo et al.: "Super-durable closed-surface antireflection thin film by silica nanocomposites", SoL Energy Mater. Sol. Cells 2017, 170,143-148.

Cai et al.: "Sol-Gel Preparation of Hydrophobic Silica Anti reflective Coatings with Low Refractive Index by Base/Acid Two-Step Catalysis", ACS Appl. Mater. Interfaces 2014, 6, 11470-11475.

Polizos et al.: "Transparent superhydrophobic surfaces using a spray coating process", Sol. Energy Mater. Sol. Cells 2018, 176, 405-410.

Jafarzadeh et al..: "Synthesis of silica nanoparticles by modified sol-gel process: the effect of mixing modes of the reactants and drying techniques", J. Sol-Gel Sci. Technol. 2009, 50, 328-336.

Kaji et al.: "Polymerization-induced phase separation in silica sol-gel systems containing formamide", J. Sol-Gel Sci. Technol. 1993, 1, 35-46.

Rudisill et al.: "Controlling Microstructural Evolution in Pechini Gels through the Interplay between Precursor Complexation, Step-Growth Polymerization, and Template Confinement", Chem. Mater. 2013, 25, 745-753.

Bogush et al.: Uniform silica particle precipitation: An aggregative growth model. J. Colloid Interface Sci. 1991, 142, 19-34.

Carcouet et al..: "Nucleation and Growth of Monodisperse Silica Nanoparticles", Nano Lett. 2014, 14, 1433-1438.

Dixit et al.: "Fast nucleation for silica nanoparticle synthesis using a sol-gel method. Nanoscale", 2016, 8, 19662-19667.

Rumpf, H.: "Particle Technology", Springer Netherlands, 1975.

Rabinovich et al.: "Adhesion between Nanoscale Rough Surfaces: I. Role of Asperity Geometry", J. Colloid Interface Sci. 2000, 232, 10-16.

* cited by examiner

FIG. 3A
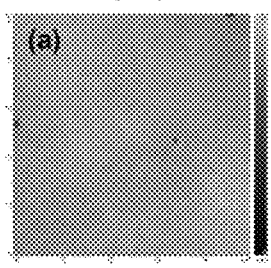
FIG. 3B
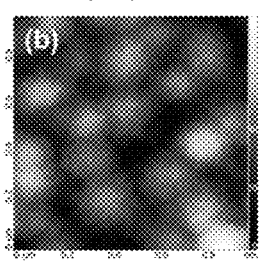
FIG. 3C
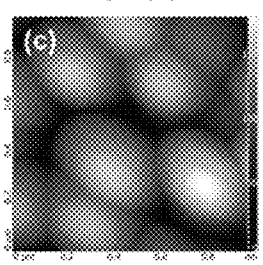
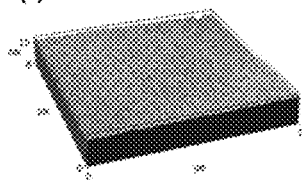
FIG. 3F
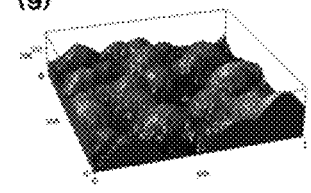
FIG. 3G
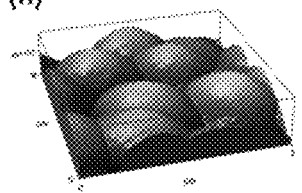
FIG. 3H

| Sample | RMS roughness (nm) | Adhesion force (nN) | Dissipation energy ( ) |
|---|---|---|---|
| Control | 0.40 | 164.41 | 25037.11 |
| 1:2 | 11.99 | 43.33 | 1611.17 |
| 1:4 | 36.25 | 11.25 | 208.97 |

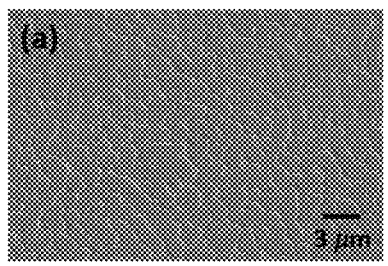 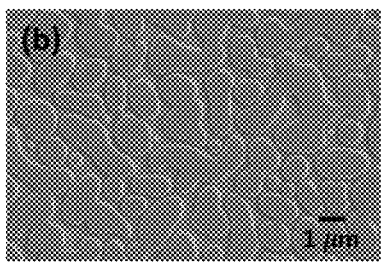 
FIG. 7A  FIG. 7B  FIG. 7C
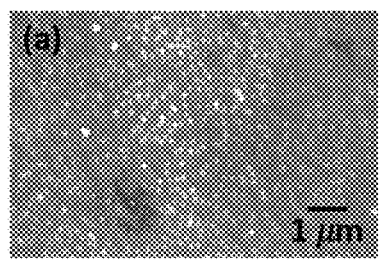 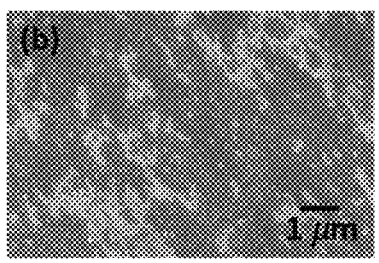 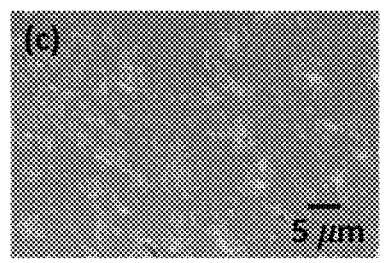
FIG. 8A  FIG. 8B  FIG. 8C

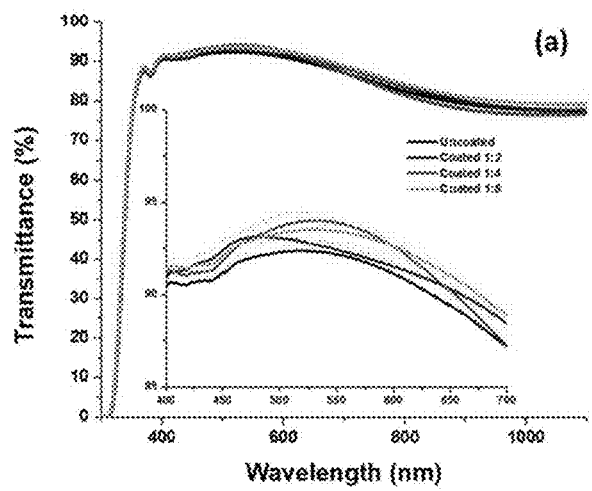
FIG. 9A
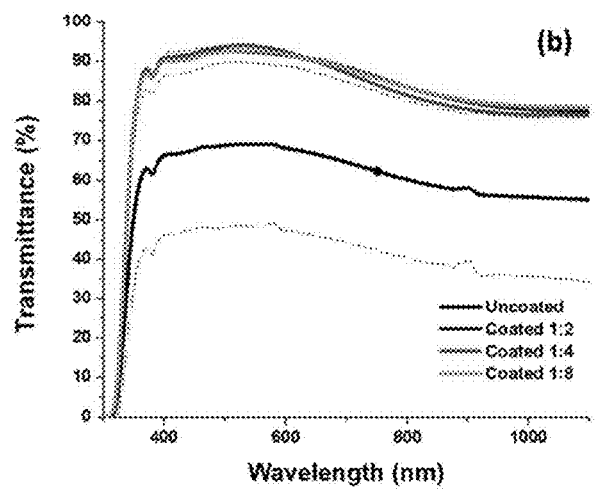
FIG. 9B
FIG. 10A
FIG. 10B
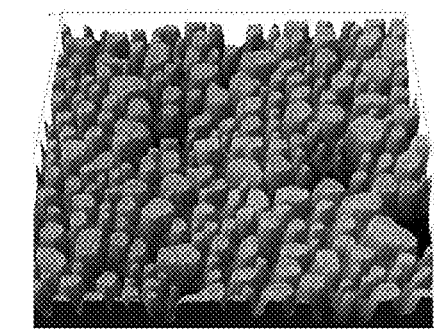
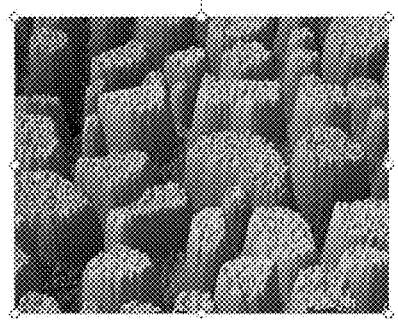
mole ratio of
TEOS:EtOH = 1:8
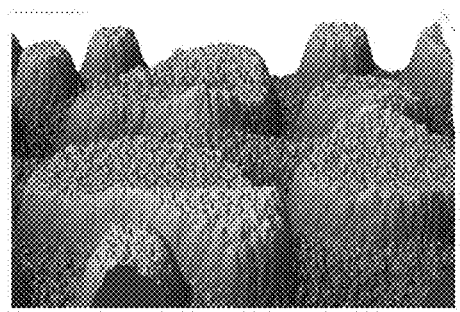
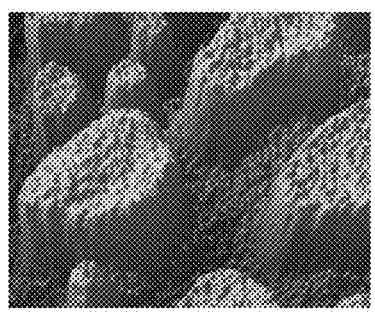
FIG. 10C
FIG. 10D

FIG. 11A
TEOS:EtOH = 1:2
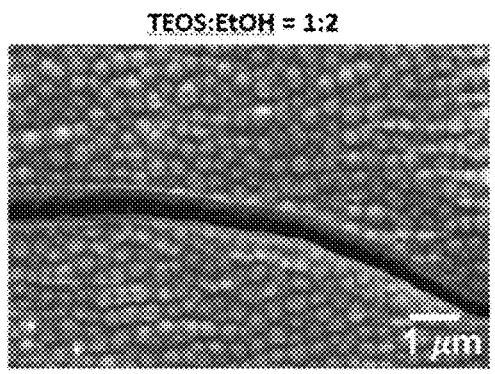
FIG. 11B
TEOS:EtOH = 1:4
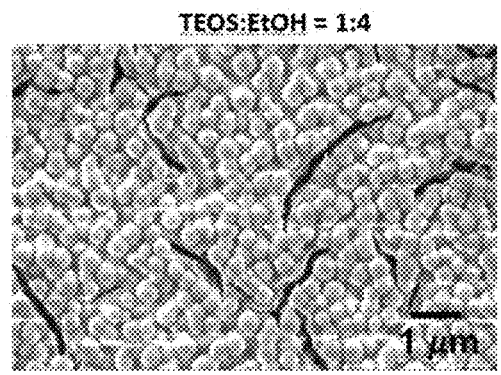
TEOS:EtOH = 1:4
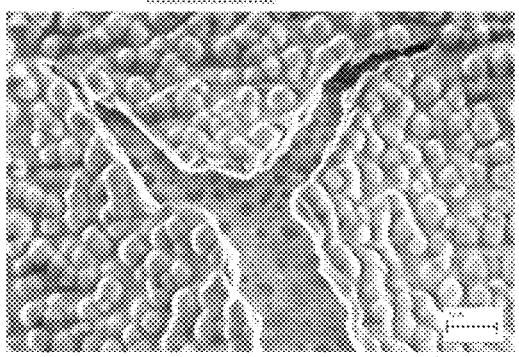
TEOS:EtOH = 1:4
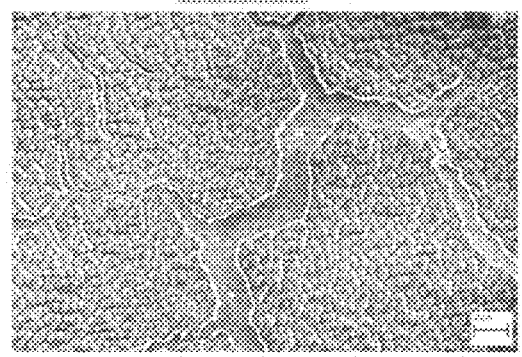
FIG. 11C
FIG. 11D

FUSED ANTI-SOILING AND ANTI-REFLECTIVE COATINGS

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in this invention.

FIELD OF THE INVENTION

The present invention is directed to nanotextured silica surfaces, and more particularly to methods of making nanotextured silica surfaces.

BACKGROUND OF THE INVENTION

High-performance solar glass and applicable coatings systems are in high demand with the development of the global solar industry including photovoltaic and concentrated solar power electricity generation. Solar power systems are usually exposed to harsh environments, arid or semi-arid desert, where there is abundant sunlight, and where these systems can be easily contaminated with airborne sand and dust. Such systems require periodic cleaning of the exposed surfaces of the solar device to efficiently generate solar power. Therefore, development of high performance coatings having excellent optical clarity with minimal reflectance, anti-soiling properties, and durability to outdoor environmental conditions and cleaning processes, is necessary to achieve high efficiency on solar energy systems as well as reductions in maintenance and operating cost.

Silica thin films have been widely used in coating applications due to its unique features of high transmission, low refractivity index, good durability and environmental resistance. Silica thin films can be prepared by the sol-gel process such as the Stöber process using different coating methods, such as spin, dip, or drawdown coating. The benefit of the sol-gel method is that the structure of the resulting silica thin film can be easily tailored with the reaction condition and its simple and low-cost processing. In the case of a base catalyzed silica sol-gel reaction, colloidal gels are formed and the resulting films have high roughness. These films can be easily removed from the substrates due to weak interaction between particles and to the substrate. With an acid catalyst, linear siloxane polymers are formed in the sol, resulting in a dense and highly cross-linked network structure with smooth surface. A base/acid two catalyst system has been proposed and this process can achieve multiple properties that cannot be possible with each individual catalyst, however, the two catalyst process requires at least two steps which makes the processing complicated and impractical for many applications.

SUMMARY OF THE INVENTION

A method for applying a coating to a surface includes the step of providing a reaction mixture comprising a silicon alkoxide and an alcohol. The silicon alkoxide is at least partially soluble in the alcohol. A reaction limiting amount of water is added to the silicon alkoxide and alcohol. The water is at least partially miscible with the alcohol. The silicon alkoxides and water are allowed to react to form silica precursor particles during an initial reaction period. A coating precursor composition is prepared by adding an acid soluble in the alcohol to the reaction mixture during a second reaction period after the initial reaction period. The precursor silica particles will grow to form silica nanofeatures having a major dimension that is larger than a major dimension of the silica precursor particles. The coating precursor composition is applied to a surface. The alcohol and water are allowed to evaporate and the silica nanofeatures adhere to the surface and form a nanostructured layer on the surface.

The silicon alkoxide can be at least one selected from the group consisting of tetraethyl orthosilicate (TEOS) and [or tetramethylorthosilicate (TMOS). The alcohol can be ethanol. The acid can be at least one selected from the group consisting of hydrochloric acid and sulfuric acid.

The nanofeatures can include at least one selected from the group consisting of silica spheres and silica rods.

The method can include, after the step of applying the coating precursor composition to a surface, applying a heat treatment to the coating precursor composition. The heat treatment can have a temperature of 20° C. to 500° C. The applying step can be performed at ambient temperature and pressure. The coating can be applied at a thickness of between 0.01-1 μm. The method can further comprise the step of applying a hydrophobic composition to the nanostructured layer.

The reaction mixture can comprise 1 silicon alkoxide, 2-10 alcohol, and 1-4 water, by molar ratios. The acid can be added to the reaction mixture 15 min after the water is added to the silicon alkoxides and alcohol. The method can include the step of, after the acid is added, waiting at least 15 min and then cooling the mixture to room temperature. The initial reaction period can be from 1-30 min. The second reaction period can be from 1-30 min.

The nanofeatures can have a diameter of 10-500 nm. The nanofeatures can have a width of 200 nm-1500 nm. The nanofeatures can have a height of 10-100 nm. The nanofeatures can have a spacing of 1-500 nm.

The silicon alkoxide/alcohol molar ratio can be 1 silicon alkoxide to 2-6 alcohol to obtain silica spheres. The silicon alkoxide/alcohol molar ratio can be 1 silicon alkoxide to 7-10 alcohol to obtain silica rods. The silicon alkoxide/alcohol molar ratio can be from 1:4 to 1:8. The silicon alkoxide/alcohol molar ratio can be 1:8.

A coating precursor composition can include a sol-gel comprising water, alcohol, and silica nanofeatures. The silica nanofeatures can include at least one selected from the group consisting of silica spheres and silica rods, and are the reaction product of silicon alkoxide and water.

A coated article can include a silica substrate and a continuous coating of silica nanofeatures. The coating can have a thickness of between 0.01 μm-1 μm. The nanofeatures can have a diameter of 10 nm-500 nm, a width of 200 nm-1500 nm, a height of 10 nm-100 nm, and a spacing of 1 nm-500 nm. The silica nanofeatures can be silica rods.

BRIEF DESCRIPTION OF THE DRAWINGS

There are shown in the drawings embodiments that are presently preferred it being understood that the invention is not limited to the arrangements and instrumentalities shown, wherein:

FIG. 2C 1:4; and FIG. 2D 1:8.

FIGS. 3A-3C and 3F-3H are AFM topology images of FIGS. 3A, 3F a control silica thin film, and nanotextured silica thin film coating prepared according to the invention at a molar ratio of TEOS to EtOH of: FIGS. 3B, 3G 1:2; FIGS. 3C, 3H 1:4.

FIGS. 5A-5C are SEM images of nanotextured silica thin film coatings prepared at 1:2 molar ratio of TEOS to EtOH with a scale of: FIG. 5A 1 μm; FIG. 5B 200 nm; and FIG. 5C 1 μm and at a defect area.

FIG. 6B 200 nm; and FIG. 6C 1 μm and at a defect area.

FIGS. 7A-7C are SEM images of nanotextured silica thin film coating prepared at 1:8 molar ratio of TEOS to EtOH with a scale of FIG. 7A 3 μm; FIG. 7B 1 μm; and FIG. 7C 3 μm and at a defect area.

FIGS. 8A-8C are silica sol prepared without acid catalyst at molar ratios of TEOS to EtOH of: FIG. 8A 1:2; FIG. 8B 1:4; and FIG. 8C 1:8.

FIGS. 9A-9B are plots of transmittance (%) vs wavelength (nm) for a nanotextured silica thin film coated on solar glasses FIG. 9A before and FIG. 9B after soiling test. The solid lines correspond to the average values and the dotted lines correspond to the standard deviation of the measured values. Spectra were obtained in 10 different locations.

FIGS. 10A-10D are 3D images of pillar structures according to atomic force microscope (AFM) examination where FIG. 10A is an image size of approximately 10×10 μm with a height of 50 nm; FIG. 10B is approximately 5×5 μm; FIG. 10C is approximately 2×2 μm; and FIG. 10D is approximately 1×1 μm.

FIGS. 11A-11D are SEM figures of coatings according to the invention molar ratios of TEOS:EtOH of 1:2 FIG. 11A at a scale of 1 μm; TEOS:EtOH of 1:4 in FIG. 11B at a scale of 1 μm; TEOS:EtOH 1:4 in FIG. 11C at a scale of 1 μm; and TEOS:EtOH 1:4 in FIG. 11D at a scale of 2 μm. The images were taken at defect sites to illustrated the integrity of the surrounding coating.

DETAILED DESCRIPTION OF THE INVENTION

The invention provides an efficient method to fabricate transparent nanotextured silica thin film coatings exhibiting anti-soiling behavior as well as enhanced durability. An acid catalyst is used to provide highly cross-linked network structures to accomplish high durability on silica thin film. The roughness and morphologies of silica thin films are tailored through a simply controlled growth pathway by adding water and acid catalyst sequentially rather than changing any variables. The roughness of silica thin film is controllable, making it possible to prepare uniform and scalable coatings on solar glass and other surfaces. The prepared nanotextured silica thin films provide enhanced anti-soiling properties without compromising the optical properties, and while provide sufficient mechanical properties.

Figure 1:
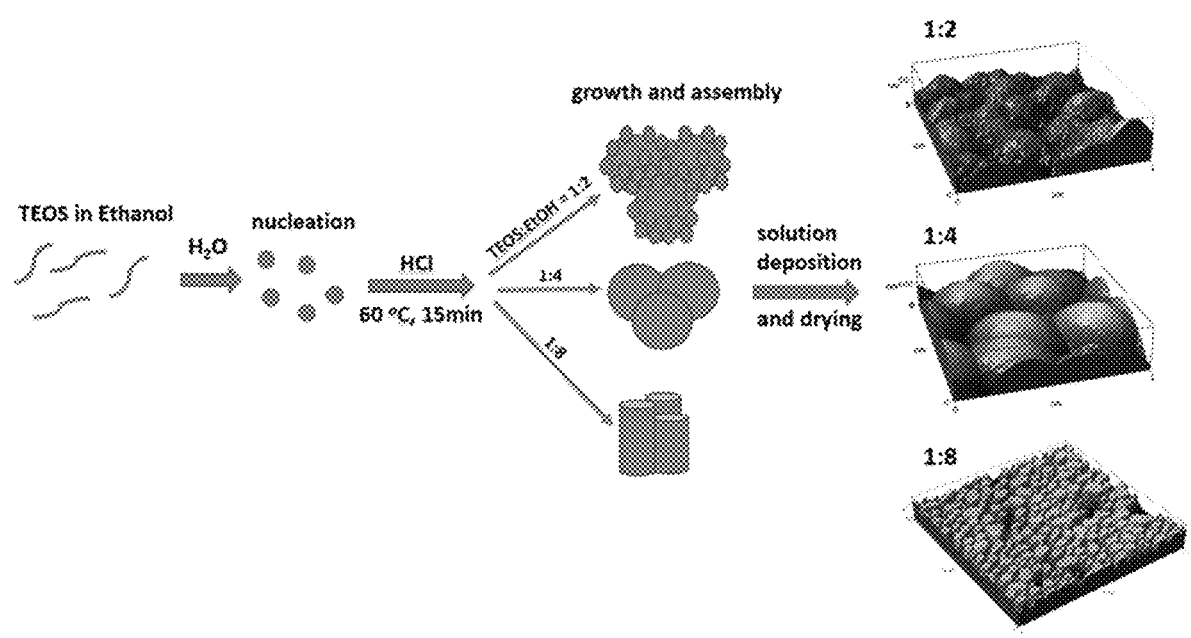
FIG. 1 is a schematic depiction of a process according to the invention.

A method for applying a coating to a surface is shown schematically in FIG. 1 and includes the step of providing a reaction mixture comprising a silicon alkoxide and an alcohol. The silicon alkoxide is at least partially soluble in the alcohol. A reaction limiting amount of water is added to the silicon alkoxide and alcohol. The water is at least partially miscible with the alcohol. The silicon alkoxides and water are allowed to react to form silica precursor particles during an initial reaction period. A coating precursor composition is prepared by adding an acid soluble in the alcohol to the reaction mixture during a second reaction period after the initial reaction period. The precursor silica particles will grow to form silica nanofeatures having a major dimension that is larger than a major dimension of the silica precursor particles. The coating precursor composition is applied to a surface, and the alcohol and water are allowed to evaporate and the silica nanofeatures adhere to the surface and form a nanostructured layer on the surface.

The silicon alkoxide can be at least one selected from the group consisting of tetraethyl orthosilicate (TEOS) and [or tetramethylorthosilicate (TMOS). Other silicon alkoxides are possible.

The alcohol can be ethanol. Other alcohols are possible so long as the silicon alkoxides and water are partially miscible in the alcohol, and the alcohol does not participate in the reaction.

The acid can be at least one selected from the group consisting of hydrochloric acid and sulfuric acid. Other acids are possible so long as the acid will catalyze the formation of the nanofeatures.

The nanofeatures can include at least one selected from the group consisting of silica spheres and silica rods. The size and geometry of the spheres and rods can be controlled according to the process of the invention.

A heat treatment can be applied to the coating precursor composition after the step of applying the coating precursor composition to a surface. The heat treatment can have a temperature of from 20° C. to 500° C. The heat treatment will assist in evaporation of the water and alcohol.

The applying to the surface step can be performed at ambient temperature and pressure. The application can be made by conventional methods.

The reaction mixture can vary in the relative proportions of silicon alkoxide, alcohol and water. The reaction mixture can include 1 silicon alkoxide, 2-10 alcohol, and 1-4 water, by molar ratios. Other ratios are possible. The molar proportion of alcohol for each mole of silicon alkoxide can be 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75 or 10, or within a range of any high and low value selected from these values. The molar proportion of water for each mole of silicon alkoxide can be 1, 1.25, 1.5, 1.75, 2, 2.25, 2.5, 2.75, 3, 3.25, 3.5, 3.75 or 4, or within a range of any high and low value selected from these values.

The ratio of silicon alkoxide to alcohol can be used to control the geometry and size of the resulting nanofeatures. In general, the higher this ratio is the smaller and spherical will be the nanofeatures, while at lower ratios the features will be larger and more rod or pillar-like in geometry. More rod-like features will impart a greater amount of texture and hence hydrophobicity to the resulting coating. For example, the silicon alkoxide/alcohol molar ratio can be 1 silicon alkoxide to 2-6 alcohol to obtain silica spheres. The silicon alkoxide/alcohol molar ratio to obtain semi-spheres can be 1 silicon alkoxide to 2, 2.5, 3, 3.5, 4, 4.5, 5, 5.5, or 6 moles alcohol, or within a range of any high or low value selected from these values. The silicon alkoxide/alcohol molar ratio can be 1 silicon alkoxide to 7-10 alcohol to obtain silica rods. The silicon alkoxide/alcohol ratio to obtain rods can be 1 silicon alkoxide to 7, 7.5, 8, 8.5, 9, 9.5, or 10 moles alcohol, or within a range of any high and low value selected from these values. It has been found that silicon alkoxide to alcohol ratios of from 1:4 to 1:8 provide more texture than surfaces prepared with a 1:2 ratio. A ratio of 1:8 has been found to produce rods or pillars of generally cylindrical shape.

The acid can be added to the reaction mixture after a period of time has passed in order to permit the initial reaction without acid to proceed. For example, the acid can be added 15 min after the reaction-limiting amount of water is added to the silicon alkoxides and alcohol. After the acid is added, the process can include waiting at least 15 min and then cooling the mixture to room temperature. The acid can be added dropwise or by other dosing protocols.

The initial reaction period during which the reaction-limiting amount of water is allowed to react with the silicon alkoxide can vary. The initial reaction period can be from 1-30 min. The initial reaction period can be 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 min, or within a range of any high and low value selected from these values.

The initial reaction during which the reaction-limiting amount of water is allowed to react with silicon alkoxide can occur at an elevated temperature. The elevated temperature can be 25, 30, 35, 40, 45, 50, 55, 60, 65, 70, 75, 80, 85, 90, 95, or 100° C., or within a range of any high value and low value selected from these values. The temperature at which the initial reaction is conducted can be 60° C.

The second reaction period during which the reaction is acid catalyzed can vary. For example, the second reaction period can be from 1-30 min. The second reaction period can be 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 min, or within a range of any high and low value selected from these values.

The thickness of the coating that is applied can vary. The coating can be applied at a thickness of between 0.01-1 μm. The coating can be applied at a thickness of 0.01, 0.02, 0.03, 0.04, 0.05, 0.06, 0.07, 0.08, 0.09, 0.10, 0.20, 0.3, 0.4, 0.5, 0.6, 0.7, 0.8, 0.9, or 1 μm, or within a range of any high and low value selected from these values.

The nanofeatures that are formed according to the invention can have different shapes and sizes. The nanofeatures can have a diameter of 10-500 nm. The nanofeatures can have a diameter of 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, or 500 nm, or within a range of any high and low value selected from these values.

The nanofeatures can have a width of 200 nm-1500 nm. The nanofeatures can have a width of 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1025, 1050, 1075, 1100, 1125, 1150, 1175, 1200, 1225, 1250, 1275, 1300, 1325, 1350, 1375, 1400, 1425, 1450, 1475 or 1500 nm, or within a range of any high and low value selected from these values.

The nanofeatures can have a height of 10-100 nm. The nanofeatures can have a height of 10, 15, 20, 25, 30, 35, 40, 45, 50, 55, 60, 65, 70, 75, 80, 85, 90, 95 or 100 nm, or within a range of any high and low value selected from these values.

The nanofeatures can have a spacing between nanofeatures of 1-500 nm. The nanofeatures can have a spacing of 1, 2, 3, 4, 5, 6, 7, 8, 9, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, or 500 nm, or within a range of any high and low value selected from these values.

The method can further include the step of applying a hydrophobic composition to the nanostructured layer. The hydrophobic composition can be selected from many different materials that will adhere to the coating and provide hydrophobicity, such as hydrophobic silanes based on fluorocarbons, and alkyl groups. The combination of the textured coating with nanofeatures formed according to the invention, and a hydrophobic layer can impart superhydrophobic properties to surface.

A coating precursor composition includes a sol-gel comprising water, alcohol, and silica nanofeatures. The silica nanofeatures comprise at least one selected from the group consisting of silica spheres and silica rods, and are the reaction product of silicon alkoxide and water.

A coated article according to the invention includes a silica substrate and a continuous coating of silica nanofeatures. The coating can have a thickness of between 0.01 μm-1 μm. The nanofeatures can have a diameter of 10 nm-500 nm, a width of 200 nm-1500 nm, a height of 10 nm-100 nm, and a spacing of 1 nm-500 nm. The silica nanofeatures can be silica rods.

A variety of structures can be generated through adjustment of the molar ratios of components in sol-gel reaction system. Due to the micro-phase separation phenomena in the silica sol solution, the structure of the resulting silica thin film was significantly different depending on the amount of EtOH that was present in the reaction mixture. TEOS is insoluble in water and the hydrolysis occurs at the interface of TEOS/water. The interaction between water and TEOS molecules is controlled by amount of EtOH present, which acts as a co-solvent in which both water and TEOS are soluble.

EXAMPLE

The silica sol-gel precursor was prepared by mixing tetraethyl orthosilicate (TEOS), ethanol (EtOH), water ($H_2O$) and hydrochloric acid (HCl) with different molar ratios. First, TEOS was dissolved in different amounts of EtOH and stirred at room temperature for 10 min. While stirring, $H_2O$ was added drop wise to the solution and it was heated to 60° C. for 15 min. TEOS was partially hydrolyzed with a deficient amount of water in solution. After 15 min, HCl was added into the solution as a catalyst, so that hydrolysis and condensation reaction could proceed further for another 15 min, and the solution was then cooled to room temperature for 30 min. The molar ratios of TEOS to EtOH in the precursor were varied in each sample, which are designated in 1:2, 1:4, 1:8, and the TEOS:H2O:HCl molar ratio was kept constant at 1:2:0.01 in all of the solutions. For comparison, silica sol-gel precursor with simultaneous mixing of materials was also prepared as a controlled trial, at 1:2 molar ratio of TEOS to EtOH.

The prepared silica sols were then applied on clean solar glasses (low iron glass) or solar mirror substrates using drawdown coating technique which is a representation of the curtain coating approach in the coating industry. An automated drawdown coater (model DP-8301, GARDCO, Pompano Beach Fla.) with 3 wire-wound Meyer rod was used for coating at a speed rate of 1 in/sec. The coated substrates were then dried in ambient condition and formed silica gel film with various nanotexture.

Field emission scanning electron microscopy (SEM) and atomic force microscopy (AFM) were used to characterize morphology and topography of coated surface. AFM probe with spherical silica particle (15 μm diameter, NanoAndMore, Watsonville Calif., USA) was used to quantify the adhesion force and energy dissipation on the coated surface. The spherical silica particle in AFM probe is used as a model for soiling effect of silica-based dust on the glass surface. For AFM measurement, the coatings were applied on Si(100) substrate. Anti-soiling properties were investigated by falling sand testing according to ASTM D968 using ISO 12103-1 A4 coarse test dust (average particle diameter of 55 μm). Then 2 g of the test dust was introduced to the test apparatus (120 cm long, 7.6 cm inside diameter) and distributed on the test surface under the apparatus. After dust accumulation, air-brushing with the squeezed-bulb dust blower (air volume=~40 ml) was applied to remove the loose dust. To evaluate anti-soiling properties, the optical properties (transparency on solar glass) of the coatings were characterized before and after the soiling testing using UV-vis spectroscopy. The mechanical properties of silica thin film were evaluated with nano-indentation and the tape test (ASTM D3359).

Generally, fibrous structures are formed when the sol gel process is performed under the acidic conditions. FIG. 2 are SEM images of (A) controlled silica thin film, and nanotextured silica thin film coatings prepared at FIG. 2(B) 1:2, FIG. 2(C) 1:4, and FIG. 2(D) 1:8 molar ratios of TEOS to EtOH. Therefore, films made from a sol made in acidic conditions result in smooth and flat films as shown in SEM image of FIG. 2(A) where HCl is added in the beginning along with other reagents. The process of the invention adds the HCl catalyst only after an initial reaction period, for example, after 15 minutes, and allows the sol-gel reaction to proceed at 60° C. When the reaction is allowed to proceed in the absence of the acidic catalyst, but at high temperature, for example higher than 50° C., though the reaction is slow some nucleation occurs because of the high temperature. This initial nucleation results in the formation of nanoscale silica particle like structures. When the HCl catalyst is added to the reaction mixture, it results in bimodal—particulate and fibrous—reaction growth. Particulate structures are formed by further deposition of silica on the nucleates formed before addition of HCl, and fibrous structures start growing after adding HCl. Fibrous structures result as TEOS is not completely consumed with deficient amount of water (1:2 molar ratio of TEOS to $H_2O$) during the 15 min time interval, and free TEOS precursor in the solution follows typical silica chain growth mechanism, growing flexible and linear structure siloxane polymers, with the acid catalyst. When this reaction mixture is used for making the film, the film shows particulate features over the coated substrate as shown in FIG. 2 and FIG. 3. FIG. 3 shows AFM topology images of controlled silica thin film in FIG. 3 (A,F), and nanotextured silica thin film coatings prepared at FIG. 3(B,G) 1:2, and FIG. 3(C,H) 1:4, molar ratios of TEOS to EtOH.

Figure 2A:
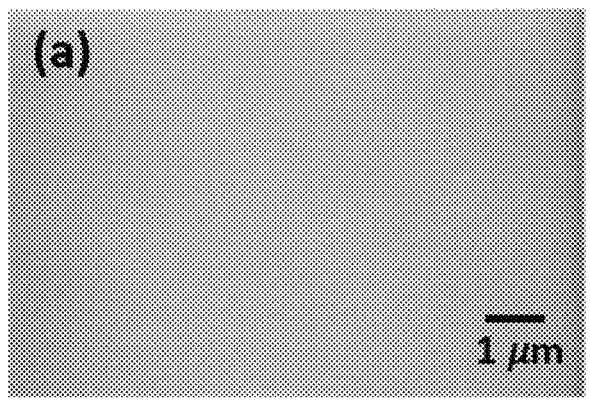
FIGS. 2A-2D are SEM images of FIG. 2A is control silica thin film, and nanotextured silica thin film coatings prepared according to the invention at molar ratios of TEOS to EtOH of FIG. 2B 1:2.
Figure 2B:
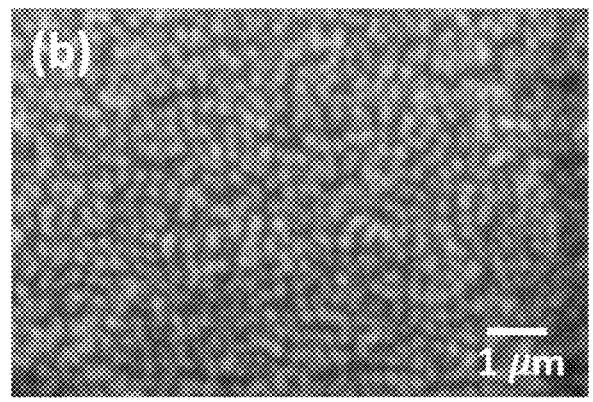
Figure 2C:
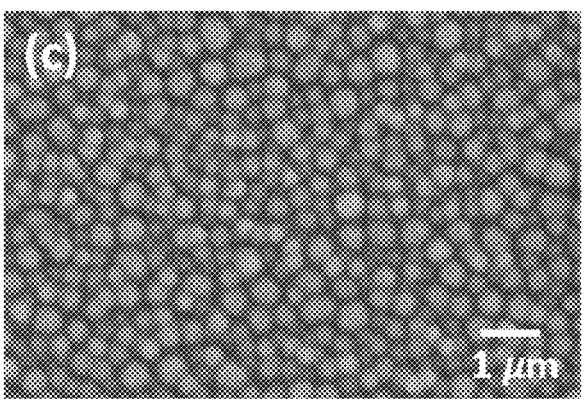
Figure 2D:
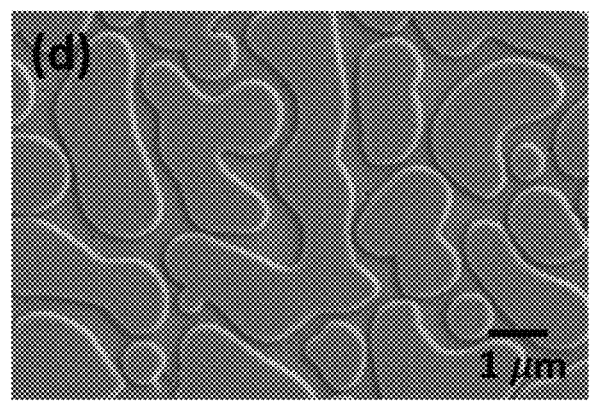

At low concentrations of EtOH, such as a 1:2 molar ratio of TEOS to EtOH, the solution has very low homogeneity. The interaction between TEOS and water molecules is restricted, which results in slowed hydrolysis, and thus slow growth of silica particles. Therefore, at lower EtOH concentrations only small silica nanoparticles are formed as shown in FIG. 2(B) and FIG. 3(B). An increase in the EtOH concentration results in the enhanced solubility of TEOs in the reaction mixture, and thus increased interaction between water and TEOS molecules, which results in an enhanced hydrolysis of TEOS molecules. Due to the increased hydrolysis rate, more hydrolysed TEOS molecules are available to deposit on initially nucleated nanoparticles, which results in larger particles a shown in FIG. 2(C) and FIG. 3(C) where TEOS to EtOH ratio is 1:4. At very high EtOH concentrations, such as 1:8 molar ratio of TEOS to EtOH, spheroids or oblong particles with high polydispersity were observed in FIG. 2(D). The high homogeneity of the solution gives rise to spinodal decomposition in sol-gel system, and different nanotextures were formed.

Since the coated surface can be easily exposed to any damage (while handling or cleaning) and environment, the coating should have good mechanical properties and high adhesion to the substrate. Nano-indentation and the tape test were used to evaluated mechanical properties of silica thin film. Nano indentation test give quantitative information on elastic modulus (E) and hardness (H) of the prepared silica thin film.

A transparent 3M Scotch tape was applied onto the silica thin film and then peeled it off quickly. No change was found on silica thin film indicating a strong adhesion to solar glass substrate.

Figure 4:
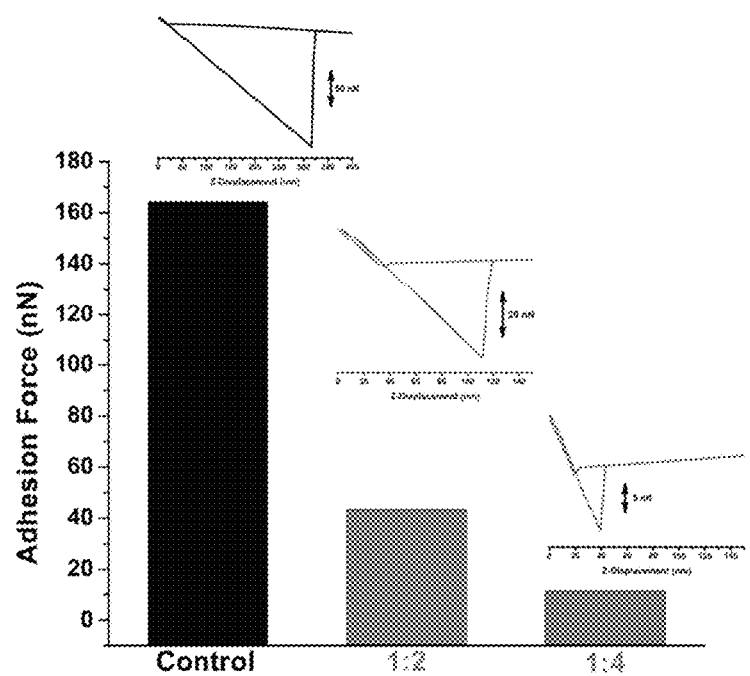
FIG. 4 is a table and plot of adhesion force measurements on the surfaces of silica thin film coatings on Si(100) substrate prepared at control, and at a molar ratio of TEOS to EtOH of 1:2 and 1:4. Measurements were performed at 10 different locations.

The adhesion force was measured on the surfaces of silica thin film coating on Si(100) substrate prepared at control, 1:2 and 1:4 silica sol-gel reaction condition using AFM. The silica thin film prepared at 1:8 was excluded for the measurement. Due to their large surface feature, the adhesion force cannot be determined accurately, and it is not reasonable to measure adhesion on large features. FIG. 4 depicts the results of adhesion force measurements on the surfaces of silica thin film coating on Si(100) substrate prepared at control, 1:2 and 1:4 silica sol-gel reaction condition. Measurements were performed on 10 different area. As shown in FIG. 4, the control sample with flat and smooth surface exhibit large adhesion force, 164 nN. However, dramatically decreased was observed on prepared nanotextured silica thin films. Compared to the control sample, they exhibit ~4-fold and 15-fold less interaction between the silica sphere on AFM probe to the coated surface, respectively. This decreased adhesive force account to the nanotexture of the prepared silica thin film. According to the Rump and the Rabinovich adhesion force models, the adhesion forces between a substrate and a particle is strongly dependent on root mean square (rms) surface roughness and the distance between the surface asperities ($\lambda$), Equation 1. The required energy dissipation for separation is ~15 times and ~120 times smaller compared to the smooth surface of control sample.

Equation 1. The adhesion force between an adhering particle and a surface with nanoscale roughness is;

$$F_{ad} = \frac{AR}{6H_0^2}\left[\frac{1}{1+\frac{32Rk_1\text{rms}}{\lambda^2}} + \frac{1}{\left(1+\frac{k_1\text{rms}}{H_0}\right)^2}\right] \quad (1)$$

where A is the Hamaker constant, R is the radius of the adhering particle, $H_0$ is the distance between the particle and the surface (~0.3 nm, when particle is in contact with the surface), rms is root mean square surface roughness, $\lambda$ is the distance between the surface asperities and $k_1$ is a constant (1.817). Equation 1 accounts only for van der Walls attraction between sand particles and surface of substrate.

Acidic conditions further stimulate the cross-linking of the particles with the fibrous structures, resulting in continued and durable nanotextured silica thin film. Also shown in FIGS. 5-7 are SEM images taken of the coatings and at the defect area at the edge of substrate where the coating was not uniform. FIGS. 5-7 show the formation of a continuous silica film structure.

Figure 5A:
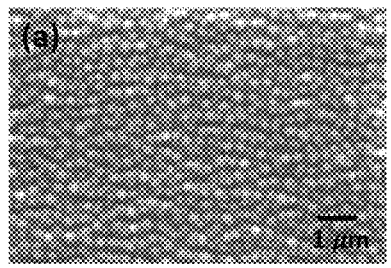
Figure 5B:
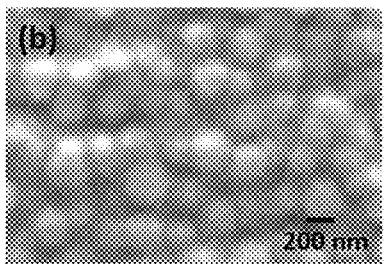
Figure 5C:
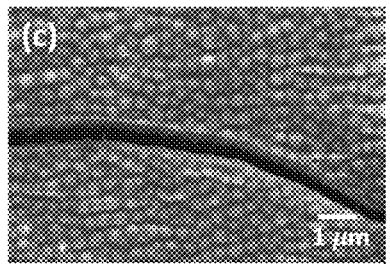

FIG. 5 shows SEM images of nanotextured silica thin film coating prepared at 1:2 molar ratio of TEOS to EtOH with different magnification and at the defect area. FIG. 5 is SEM images of nanotextured silica thin film coating prepared at 1:2 molar ratio of TEOS to EtOH with a scale of: FIG. 5(A) 1 μm; FIG. 5(B) 200 nm; and FIG. 5(C) 1 μm and at a defect area to show the continuous nature of the surrounding coating.

Figure 6A:
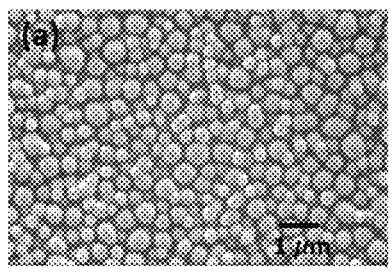
FIGS. 6A-6C are SEM images of nanotextured silica thin film coating prepared at 1:4 molar ratio of TEOS to EtOH with a scale of d FIG. 6A 1 μm.
Figure 6B:
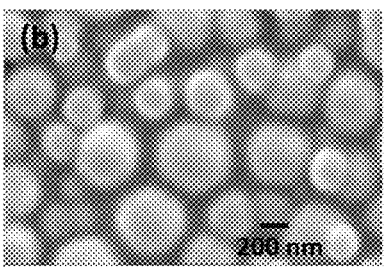
Figure 6C:
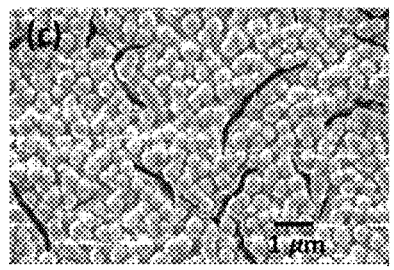

FIG. 6 is SEM images of nanotextured silica thin film coating prepared at 1:4 molar ratio of TEOS to EtOH with a scale of d FIG. 6(A) 1 μm; FIG. 6(B) 200 nm; and FIG. 6(C) 1 μm and at a defect area to show the continuous nature of the surrounding coating.

FIG. 7 is SEM images of nanotextured silica thin film coating prepared at 1:8 molar ratio of TEOS to EtOH with a scale of FIG. 7(A) 3 μm; FIG. 7(B) 1 μm; and FIG. 7(C) 3 μm and at a defect area to show the continuous nature of the surrounding coating.

FIG. 8 is silica sol prepared without acid catalyst at a molar ratio of TEOS to EtOH of: FIG. 8(A) shows a coating prepared at a ratio of 1:2. FIG. 8(B) shows a coating prepared at a ratio of 1:4. FIG. 8(C) shows a coating prepared at a ratio of 1:8. Without acid catalyst, prepared silica sol did not adhere onto the substrate and there was not textured coating film formation.

The nanostructured features are fused together and form a continuous film. The developed coatings can be fused onto the surface of glass or other substrates. The coating is fused on the desired surface and is very durable. It can be applied using draw down or spray-on application of a solution. After the curing of the applied solution, a fused layer is formed.

Observation of before and after soiling tests on solar coated and uncoated glass and solar mirror were performed. The 1:4 molar ratio of TEOS:EtOH silica sol was applied to the coated side. The uncoated side showed significantly more soiling than the coated side.

Sand falling testing was performed on half-coated solar mirrors with the sol-gel based anti-soiling coating. The coatings were fluorocarbon free. The coated side showed significantly more soiling than did the coated side. After rinsing with residual water the coated side showed greater response to sand removal by the water than did the uncoated side.

To further evaluate the anti-soiling property of the coatings, the optical transmittance measurements in the ultra-violet-visible spectral region (200-1100 nm) were performed before and after soiling test at 10 different areas. The decrease in transmittance is strongly correlated to the degree of soiling. The same coating was applied on solar glass and the transmittance was measured before and after the soiling experiments. The coated glass showed greater resistance to soiling than did the uncoated glass. The transmittance spectra is shown in FIG. 9. The average decrease in the transmittance of the soiled uncoated solar glass is 20%. FIG. 9 is the transmittance spectra of nanotextured silica thin film coated on solar glasses (a) before and (b) after soiling test. The solid lines correspond to the average values and the dotted lines correspond to the standard deviation of the measured values. Spectra were obtained in 10 different areas. FIG. 9 shows that the maximum transmittance of the solar glass is reached as high as 92.4% in the visible range (380-760 nm) while the maximum transmittance of the silica thin film coated solar glass is slightly increased to 93.1-94.3% due to its anti-reflective effect of silica thin film. After soiling test, the uncoated solar glass loss approximately 23% of transmittance with very large variation, ±25.3%. due to non-uniform soiling on the substrate. However, it is noted that no significant difference was observed before and after soiling test on coated solar glassed. They maintain nearly the same transmittance with less than 1% variation which indicate high uniformity of the coating. The optical images of before and after soiling test on solar glass and mirror clearly show the huge difference soiling result on coated and uncoated solar glass and mirror, (One half was coated, and the other half was uncoated to allow a comparison).

The invention produced very good nanotexture in the form of pillars. FIG. 10 shows 3D images of pillar structures according to atomic force microscope (AFM). The images show well-defined pillars and significant nanotexture formed in a continuous coating.

FIG. 11 shows SEM figures of coatings according to the invention molar ratios of TEOS:EtOH of 1:2, FIG. 11(A); TEOS:EtOH of 1:4 in FIG. 11(B) at a scale of 1 μm; TEOS:EtOH 1:4 in FIG. 11(C) at a scale of 1 μm; and TEOS:EtOH 1:4 in FIG. 11(D) at a scale of 2 μm. The images were taken at defect sites to illustrated the integrity of the surrounding coating.

Figure 12A:
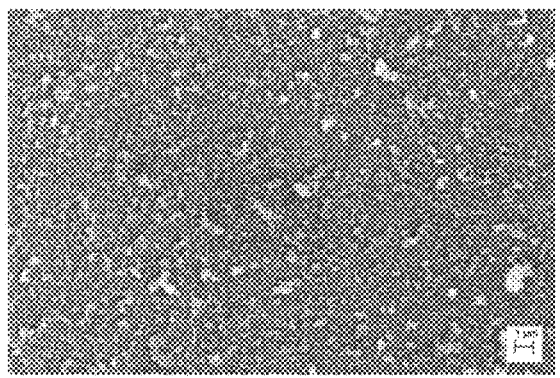
FIGS. 12A and 12B are comparative image SEM images of coatings comprising spray coated nanoparticles at a scale of 1 μm and 200 nm.
Figure 12B:
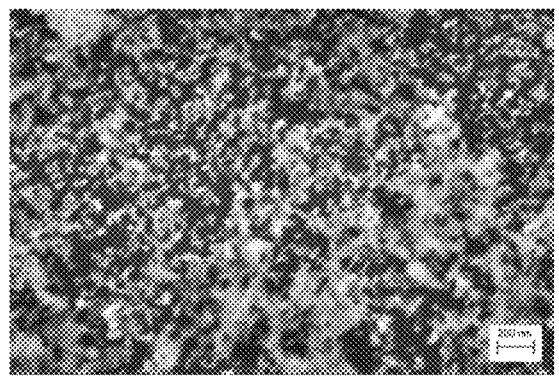

FIG. 12 is a comparative image SEM images of coatings comprising spray coated nanoparticles at a scale of FIG. 12(A) 1 μm and FIG. 12(B) 200 nm.

Advantages over existing anti-soiling coatings include: this invention is one-step application method of a solution; durability—the coating is fused on the glass surface and is not an add-on film; there are no organic components and no UV degradation; there is no chemical etching or sputtering; and the invention is low cost, scalable, easy to retrofit and re-apply, and environmentally friendly.

The invention provides a one-step approach to fabricated transparent nanotextured silica thin film that can be controlled by manipulating silica sol preparation method. The prepared coating exhibited rough and continuous film structure, and the nanotextured surface contributed to the enhanced anti-soiling efficiency. There are general correlations on reaction condition to nanotextures of silica thin film. The adhesion force measurements demonstrated low interaction between the coated surface to silica spheres on AFM probe, and sand falling test demonstrated a high anti-soiling property to test dust. The continuous phase of the prepared silica thin film allows high durability and adhesion to the glass substrate. The coatings of the invention provide performance in anti-soiling, optical, and mechanical properties, and can be used in solar energy industry and in other industries such as display devices, or high-end windows to reduce maintenance costs and improve the energy efficiency, and in other applications.

This invention can be embodied in other forms without departing from the spirit or essential attributes thereof. Accordingly, reference should also be made to the following claims to determine the scope of the invention.

We claim:

1. A method for applying a coating to a surface, comprising the steps of:

providing a first reaction mixture comprising a silicon alkoxide and an alcohol, the silicon alkoxide being at least partially soluble in the alcohol;

adding no more than a reaction limiting amount of water to the silicon alkoxide and alcohol, the water being at least partially miscible with the alcohol, to create a second reaction mixture;

allowing the silicon alkoxide and water of the second reaction mixture to react to form silica precursor particles during an initial reaction period of from 1-30 minutes;

preparing a coating precursor composition by adding an acid soluble in the alcohol to the second reaction mixture during a second reaction period after the initial reaction period, whereby the silica precursor particles will grow to form silica nanofeatures having a major dimension that is larger than a major dimension of the silica precursor particles;

applying the coating precursor composition to a surface, and allowing the alcohol and water to evaporate and the silica nanofeatures to adhere to the surface and form a nanostructured layer on the surface.

2. The method of claim 1, wherein the silicon alkoxide is at least one selected from the group consisting of tetraethyl orthosilicate (TEOS) and [or tetramethylorthosilicate (TMOS).

3. The method of claim 1, wherein the alcohol is ethanol.

4. The method of claim 1, wherein the acid is at least one selected from the group consisting of hydrochloric acid and sulfuric acid.

5. The method of claim 1, wherein the nanofeatures comprise at least one selected from the group consisting of silica spheres and silica rods.

6. The method of client 1, wherein after the step of applying the coating precursor composition to a surface, a heat treatment is applied to the coating precursor composition, the heat treatment having a temperature of 20° C. to 500° C.

7. The method of claim 1, wherein the applying step is performed at ambient temperature and pressure.

8. The method of claim 1, wherein the second reaction mixture comprises 1 silicon alkoxide, 2-10 alcohol, and 1-4 water, by molar ratios.

9. The method of claim 1, wherein the acid is added to the second reaction mixture 15 min after the water is added to the silicon alkoxide and alcohol.

10. The method of claim 1, wherein after the acid is added, waiting at least 15 min and then cooling the mixture to room temperature.

11. The method of claim 1, wherein the second reaction period is from 1-30 min.

12. The method of claim 1, wherein the coating is applied at a thickness of between 0.01-1 µm.

13. The method of claim 1, wherein the nanofeatures have a diameter of 10-500 nm.

14. The method of claim 1, wherein the nanofeatures have a width of 200 nm-1500 nm.

15. The method of claim 1, wherein the nanofeatures have a height of 10-100 nm.

16. The method of claim 1, wherein the nanofeatures have a spacing of 1-500 nm.

17. The method of claim 1, further comprising the step of applying a hydrophobic composition to the nanostructured layer.

18. The method of claim 1, wherein the silicon alkoxide/alcohol molar ratio is 1 silicon alkoxide to 2-6 alcohol to obtain silica spheres.

19. The method of claim 1, wherein the silicon alkoxide/alcohol molar ratio is 1 silicon alkoxide to 7-10 alcohol to obtain silica rods.

20. The method of claim 1, wherein the silicon alkoxide/alcohol molar ratio is from 1:4 to 1:8.

21. The method of claim 1, wherein the silicon alkoxide/alcohol molar ratio is 1:8.

* * * * *